United States Patent [19]

Schluter

[11] Patent Number: 4,656,670
[45] Date of Patent: Apr. 14, 1987

[54] MULTI-FUNCTION BEACH TOWEL

[76] Inventor: Hans Schluter, 5826 Bowcroft St., #1, Los Angeles, Calif. 90016

[21] Appl. No.: 764,184

[22] Filed: Aug. 9, 1985

[51] Int. Cl.⁴ .................. A47G 9/06; A41D 23/00
[52] U.S. Cl. .................................. 2/92; 2/67; 2/69
[58] Field of Search .................. 2/67, 69, 92

[56] References Cited

U.S. PATENT DOCUMENTS

| | | | |
|---|---|---|---|
| 1,432,249 | 11/1922 | Hoyme | 2/69 |
| 1,497,685 | 1/1924 | Hoyme | 2/69 |
| 2,264,471 | 12/1941 | Glenn | 5/344 |
| 3,013,274 | 12/1961 | Dike | 2/67 |
| 3,176,315 | 4/1965 | Freund | 2/67 |
| 4,231,125 | 11/1980 | Tittl | 5/419 |

Primary Examiner—Doris L. Troutman
Attorney, Agent, or Firm—Spensley Horn Jubas & Lubitz

[57] ABSTRACT

A combination beach towel and robe having a releasably secured flap for closing the head opening of the robe. In another aspect, a pocket is provided at one end of the towel to facilitate use of the towel as a car seat cover and to also provide a pocket for use when the beach towel is used as a robe.

12 Claims, 5 Drawing Figures

U.S. Patent   Apr. 14, 1987   4,656,670
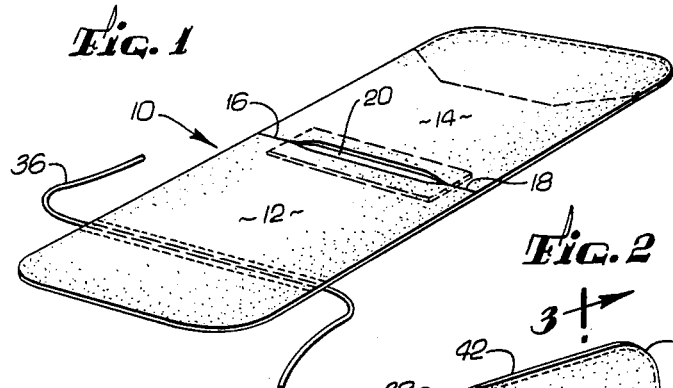
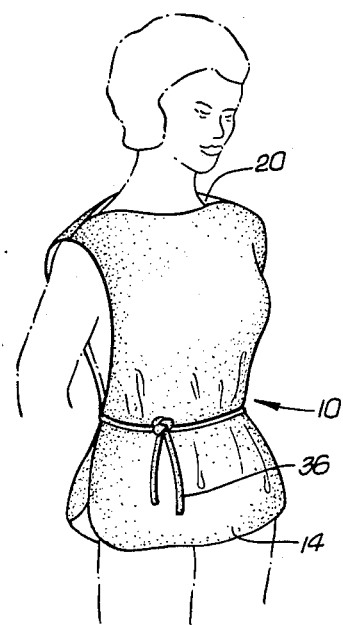
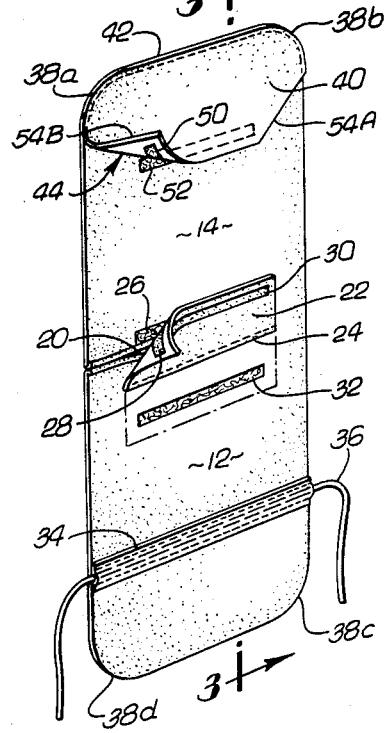
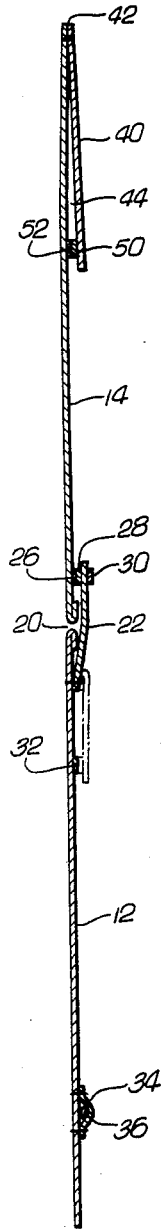
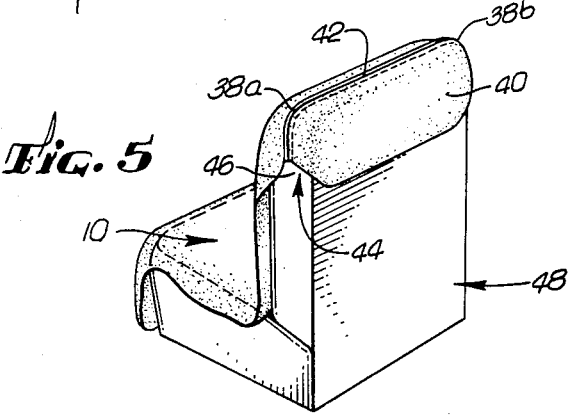

MULTI-FUNCTION BEACH TOWEL

FIELD OF THE INVENTION

The invention relates to a novel article designed to function as a towel, a robe or a car seat cover.

BACKGROUND OF THE INVENTION

Articles designed to function as both a robe and a towel are well known. (See, e.g., U.S. Pat. Nos. 3,176,315, 3,013,274, 1,432,249 and 1,497,685). Nonetheless, these known combination towel/robes are lacking in several respects. The opening for the wearer's head in the towel/robes shown in U.S. Pat. Nos. 3,176,315, 1,497,685 and 1,432,249 is not provided with a closure mechanism. Thus, when used as a beach towel, sand will tend to enter through this opening thereby causing user discomfort.

In contrast, the head opening of the article shown in U.S. Pat. No. 3,013,274 can be somewhat closed. Snap fasteners positioned on either side of the head opening constitute the closure mechanism. However, the snap fastener closure mechanism of the '274 patent is likely to have certain drawbacks. For example, upon closing of such a closure arrangement, the fabric on either side of the opening would be drawn together and would tend to bunch, thereby forming ridges in the thusly formed towel. These ridges would be uncomfortable to lie upon. Furthermore, gaps between the fasteners are likely to admit sand.

SUMMARY OF THE INVENTION

An object of the present invention is to provide an improved beach towel obviating, for practical purposes, the above-mentioned limitations.

It is a further object of the present invention to provide an improved beach towel which may be conveniently used as a car seat as well as a robe.

These and other objects and advantages are provided by a beach towel in accordance with the present invention which is comfortable to use, either as a robe or a beach towel. This is achieved by providing a large central opening in the the beach towel through which a wearer's head may be inserted when the towel is worn as a robe. To keep sand from passing through the central opening when the towel is used as a beach towel, a large flap is provided which, in the illustrated embodiment, may be folded over and releasably attached to the towel to securely close the opening.

In another aspect of the present invention, one end of the towel is configured to form a pocket which is shaped to receive the upper end of a car seat. Accordingly, the beach towel may be conveniently used as a car seat cover as well. The flap covering the central opening keeps sand from the wearer's body from passing through the central opening to the car seat.

BRIEF DESCRIPTION OF THE DRAWINGS

FIG. 1 is a perspective view of the top of a beach towel in accordance with a preferred embodiment of the present invention;

FIG. 2 is a perspective view of the bottom of the beach towel of FIG. 1 showing portions of two flaps partially detached;

FIG. 3 is a cross-sectional view of the towel of FIG. 2 shown along the lines 3—3;

FIG. 4 is a perspective view of the towel of FIG. 1 shown being worn as a robe; and FIG. 5 is a perspective view of the towel of FIG. 1 being used as a car seat cover.

DETAILED DESCRIPTION OF THE DRAWINGS

A beach towel in accordance with a preferred embodiment of the present invention is indicated generally at 10 in FIG. 1. In the illustrated embodiment, the towel 10 is formed from two generally rectangular fabric pieces 12 and 14, the edges of which are sewn together at 16 and 18 to define a slot 20 between the abutting edges of the fabric pieces 12 and 14. The fabric pieces 12 and 14 are preferably made of a thick terrycloth material but other fabrics may be selected as well.

As shown in FIG. 2, the beach towel 10 includes a long rectangular terrycloth fabric flap 22 on the bottom of the towel 10, which is attached at an edge 24 parallel to and displaced from the opening 20 of the towel 10. The flap 22 is sufficiently long such that when the flap 22 is folded over the opening 20, the opening 20 is completely covered. To releasably secure the flap 22 to the fabric piece 14 in the closed position, the fabric piece 14 has a loop strip 26 positioned to mate with a corresponding hook strip 28 of a hook and loop type fastener (Velcro TM). As shown in FIG. 1 with the flap 22 secured in the closed position, the opening 20 is completely closed so that sand is substantially prevented from passing through the opening 20 to irritate the sunbather laying on the beach towel 10.

To use the beach towel 10 as a robe, the hook strip 28 is peeled away from the loop strip 26 to allow the flap 22 to be folded over away from the opening 20. Opposite the hook strip 28 on the other side of the flap 22, the flap 22 has a second hook strip 30 positioned to mate with a second loop strip 32 attached to the other fabric piece 12. In this manner, the flap 22 may be releasably secured in the open position (represented in phantom in FIG. 3). Accordingly, the user's head may then be inserted through the opening 20 so that the beach towel 10 may be worn as a robe as shown in FIG. 4.

A long thin rectangular piece of fabric 34 is attached at its longitudinal edges transversely across the lower portion of the fabric piece 12 to form a transverse continuous belt loop as best seen in FIGS. 2 and 3. Passing through the belt loop 34 is a rope belt 36 which may be tied about the wearer's waist as shown in FIG. 4. In the illustrated embodiment, the fabric strip 34 is made of a light weight but durable material such as nylon netting material, although it is recognized that other materials may be used as well.

In the illustrated embodiment, the fabric pieces 12 and 14 have rounded corners as indicated at 38a–d. To form a pocket at the end of the fabric piece 14, a second terrycloth flap 40 is peripherally sewn to the edge of the fabric piece 14 at the rounded corners 38a and 38b and the flap end portion 42 of the fabric piece 14. The pocket 44 thereby formed is shaped to receive the upper end 46 of a car seat 48 as shown in FIG. 5. The remainder of the beach towel 10 may be draped over the car seat as shown in FIG. 5 to form a car seat cover. The pocket 44 when placed over the car seat back helps prevent the towel 10 from falling off the car seat back. The flap 22 is preferably secured in the closed position to prevent sand from passing from the driver's body through the opening 20 to the car seat.

Referring now to FIGS. 2 and 3, the flap 40 has a hook strip 50 positioned to mate with a loop strip 52 attached to the fabric piece 14 so that the car seat pocket 44 may be used as a robe pocket when the beach towel 10 is used as a robe, as shown in FIG. 4. The flap 40 is diagonally cut as indicated at 54A and 54B in FIG. 2 to facilitate the insertion of the wearer's hands into the pocket 44 when worn as a robe.

It is seen from the above that the present invention provides a novel beach towel which may be comfortably worn as a robe without sacrificing its utility as a beach towel. Furthermore, the beach towel has a pocket at one end which may be utilized as either a robe pocket when the towel is worn as a robe or as a car seat cover pocket to facilitate the use of the beach towel as a car seat.

It will, of course, be understood that modifications of the present invention, in its various aspects, will be apparent to those skilled in the art, some being apparent only after study and others being merely matters of routine design. Other embodiments are also possible with their specific designs dependant upon the particular application. As such, the scope of the invention should not be limited by the particular embodiment herein described, but should be defined only by the appended claims and equivalents thereof.

What is claimed is:

1. A combination towel and robe comprising:
   an elongate fabric piece defining an opening for a wearer's head, said opening being substantially in the central portion of said piece;
   a flap having one edge attached to said fabric piece substantially in the vicinity of said opening;
   attachment means for releasably attaching the opposite edge of said flap to said piece so that said flap covers said opening when said opposite edge is attached; and
   second attachment means for releasably attaching said opposite edge of said flap to said piece away from said opening so that said flap can further be releasably attached to said fabric piece in a position wherein said opening is uncovered.

2. The combination towel and robe of claim 1 wherein said first attachment means comprises mating strips of hook and loop fastener strips, at least one such strip being attached to said surface of said fasbric piece and at least one mating strip being attached to said flap.

3. The combination towel and robe of claim 1 further including belt means for securing the fabric piece about the wearer's waist.

4. The combination towel and robe of claim 1 wherein the fabric piece defines a pocket at one end configured to receive the upper portion of a car seat.

5. The combination towel and robe of claim 4 wherein the piece has a flap portion defining the pocket, said pocket flap portion having a free edge and attachment means for releasably attaching the pocket free edge to the fabric piece to thereby form a pocket for the combination when used as a robe.

6. A combination towel and car seat cover comprising: an
   elongate generally rectangular fabric piece and a fabric flap attached in overlying fashion to one end of said fabric piece, to form a pocket configured to fit over the upper edge of a car seat, said fabric piece having a length in excess of five feet to facilitate use of the piece as a beach towel;
   wherein the fabric piece defines a central opening through which a wearer's head may be inserted, said piece further having a flap attached at one edge adjacent to the opening and means for attaching the other edge of said flap to a surface of said fabric piece to thereby cover the opening.

7. A combination towel, car seat cover and robe comprising:
   an elongate, substantially rectangular fabric piece with an opening for a wearer's head substantially in the central portion thereof;
   a first flap having one edge attached to said fabric piece substantially in the vicinity of said opening;
   first attachment means for releasably attaching the opposite edge of said flap to the piece so that said first flap covers said opening;
   a second flap attached in overlying fashion to an end edge of said fabric piece to form a pocket configured to fit over the upper edge of a car seat wherein the fabric piece may cover the seating surface of the car seat.

8. The combination towel, car seat and robe of claim 7 further including second attachment means for releasably attaching an edge of said second flap to the surface of said fabric piece.

9. A combination towel, car seat and robe comprising:
   an elongate substantially rectangular fabric piece with an opening for a wearer's head substantially in the central portion thereof;
   a first flap having one edge attached to said fabric piece substantially in the vicinity of said opening;
   first attachment means for releasably attaching the opposite edge of said flap to the piece so that said first flap covers said opening;
   a second flap attached in overlying fashion to an end edge of said fabric piece to form a pocket configured to fit over the upper edge of a car seat wherein the fabric piece may cover the seating surface of the car seat; and
   second attachment means for releasably attaching said first flap to said fabric piece in a position wherein said opening is uncovered.

10. The combination towel, car seat and robe of claim 7 wherein said first attachment means comprises mating strips of hook and loop fasteners, at least one such strip being attached to said fabric piece and at least one mating strip being attached to said first flap.

11. The combination towel, car seat and robe of claim 9 further including belt means for securing the fabric piece about the wearer's waist.

12. A combination towel, car seat cover, and pocketed robe comprising:
   an elongate, substantially rectangular fabric piece serving as a towel wherein said fabric piece has an opening for a wearer's head substantially in the central portion allowing wearing as a robe; and
   a flap attached in an overlying fashion to an edge of said fabric piece to form a pocket configured to fit over the top of a car seat so that the fabric piece when extended from said top can cover a surface of the car seat, wherein said flap attached at said edge of said fabric piece forms a pocket open to the top when said fabric piece is worn as a robe.

* * * * *